United States Patent
Brown, Jr.

[15] 3,647,335
[45] Mar. 7, 1972

[54] APPARATUS FOR FORMING CONTAINERS

[72] Inventor: Fred P. Brown, Jr., Centerville, Mass.
[73] Assignee: Packaging Industries, Inc., Hyannis, Mass.
[22] Filed: Apr. 11, 1969
[21] Appl. No.: 815,292

[52] U.S. Cl..............................425/143, 425/162, 425/302, 425/395
[51] Int. Cl..........................................B29c 3/04, B29c 3/06
[58] Field of Search.................18/4 P, 4 R, 19 H, 19 R, 19 F, 18/16 I, 17 R

[56] References Cited

UNITED STATES PATENTS

| | | | |
|---|---|---|---|
| 3,105,270 | 10/1963 | Fibish | 18/DIG. 39 |
| 3,115,677 | 12/1963 | Thiel | 18/DIG. 39 |
| 3,283,046 | 11/1966 | DeWitt et al. | 18/4 X |
| 3,359,600 | 12/1967 | O'Brien et al. | 18/1 FM |

*Primary Examiner*—Robert L. Spicer, Jr.
*Attorney*—Kenyon & Kenyon Reilly Carr & Chapin

[57] ABSTRACT

The disclosure relates to a method and apparatus for forming articles such as containers. In accordance with the disclosure, a web of thermoplastic material is held along the opposite edges extending along the length thereof while being passed through an article-forming station, a printing station, a trimming station, and if required, a heating station. The movement of the web of plastic material through the apparatus is intermittent in order to provide time sufficient to enable the necessary operations to be performed at each station. The formed article produced by the machine is ready for its ultimate use when discharged from the last station of the machine.

21 Claims, 25 Drawing Figures

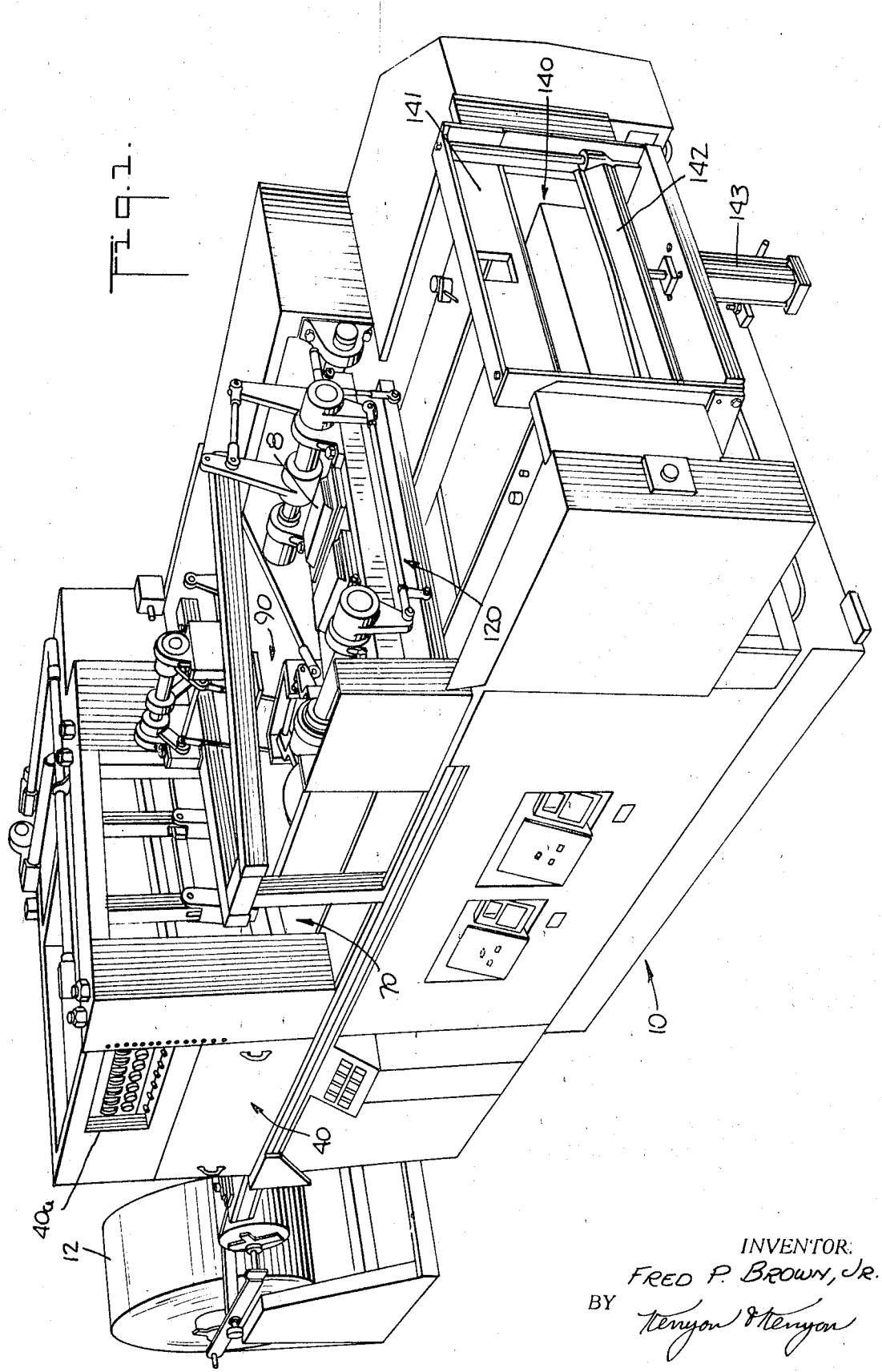

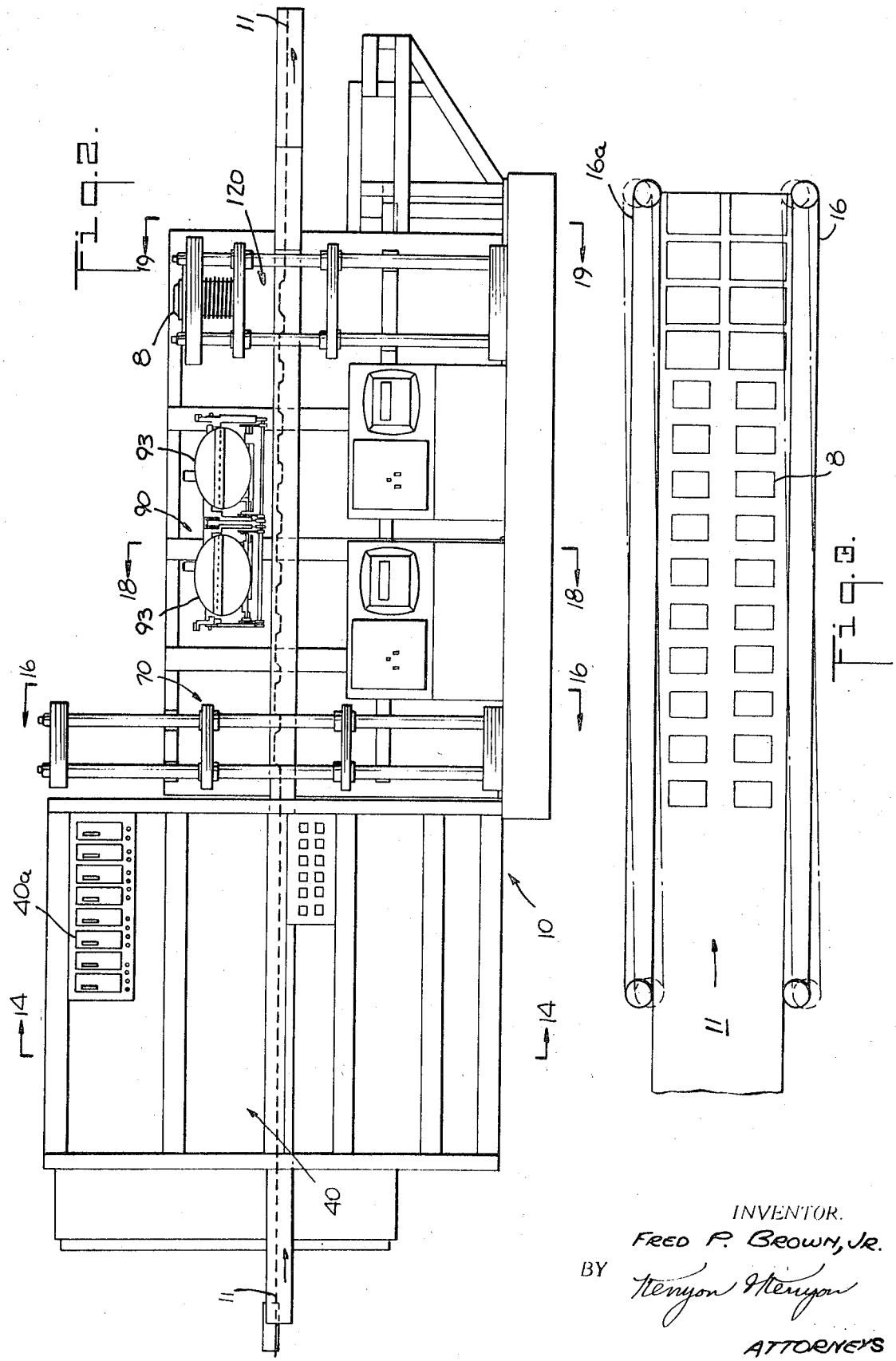

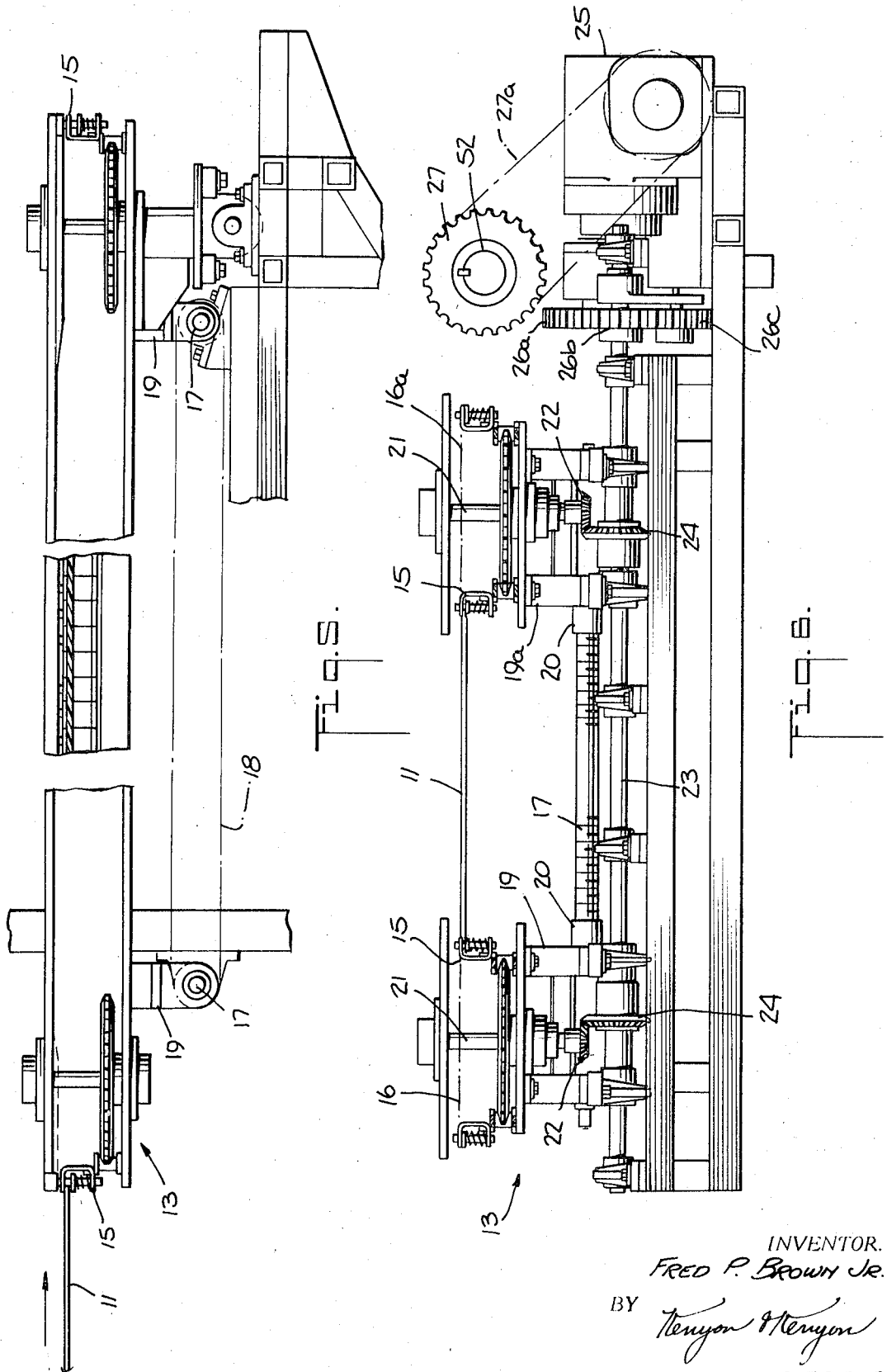

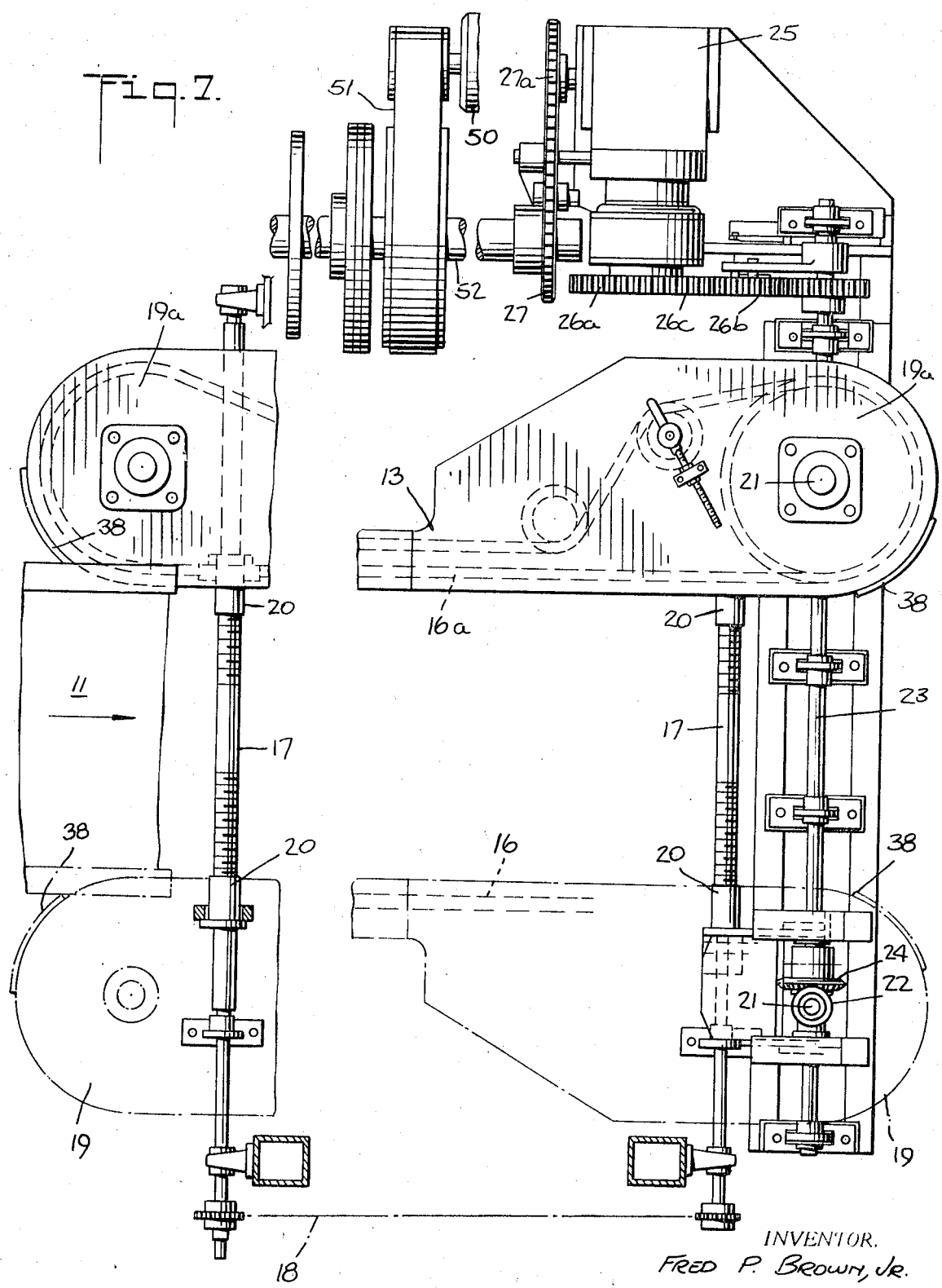

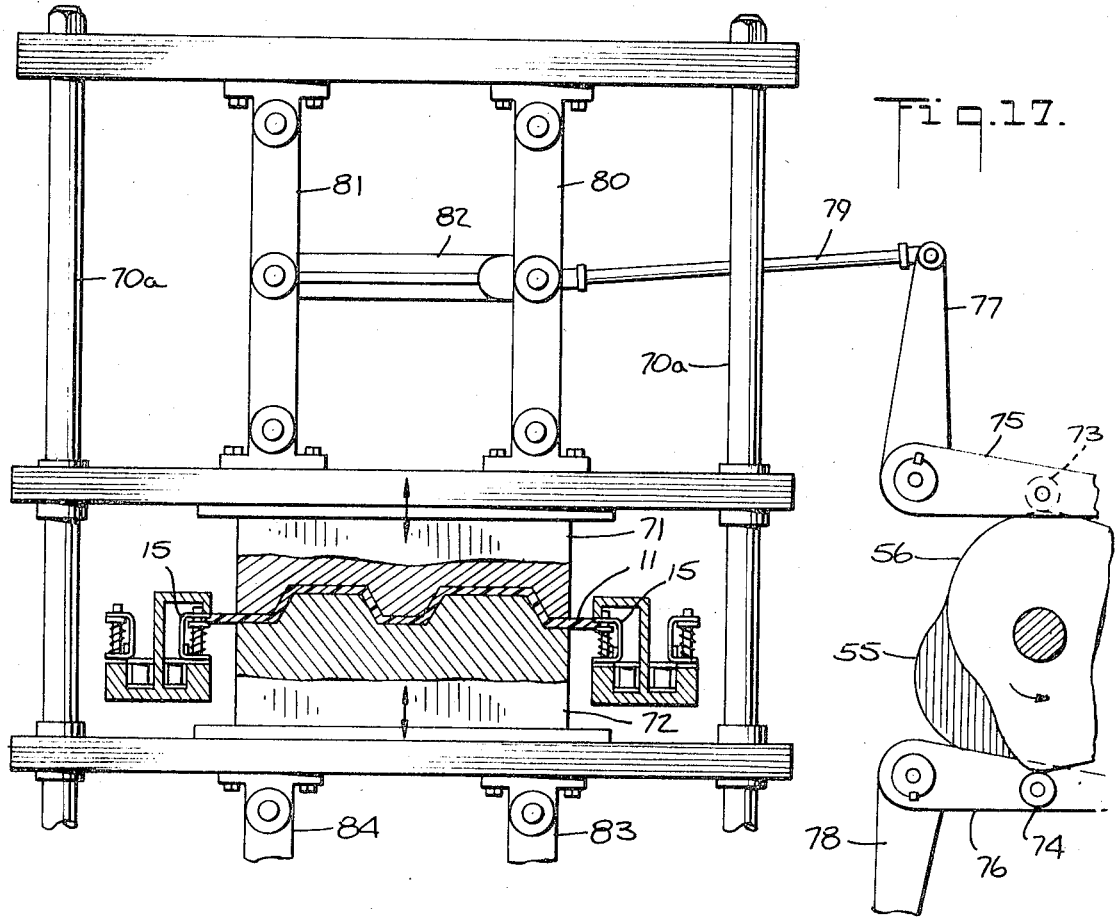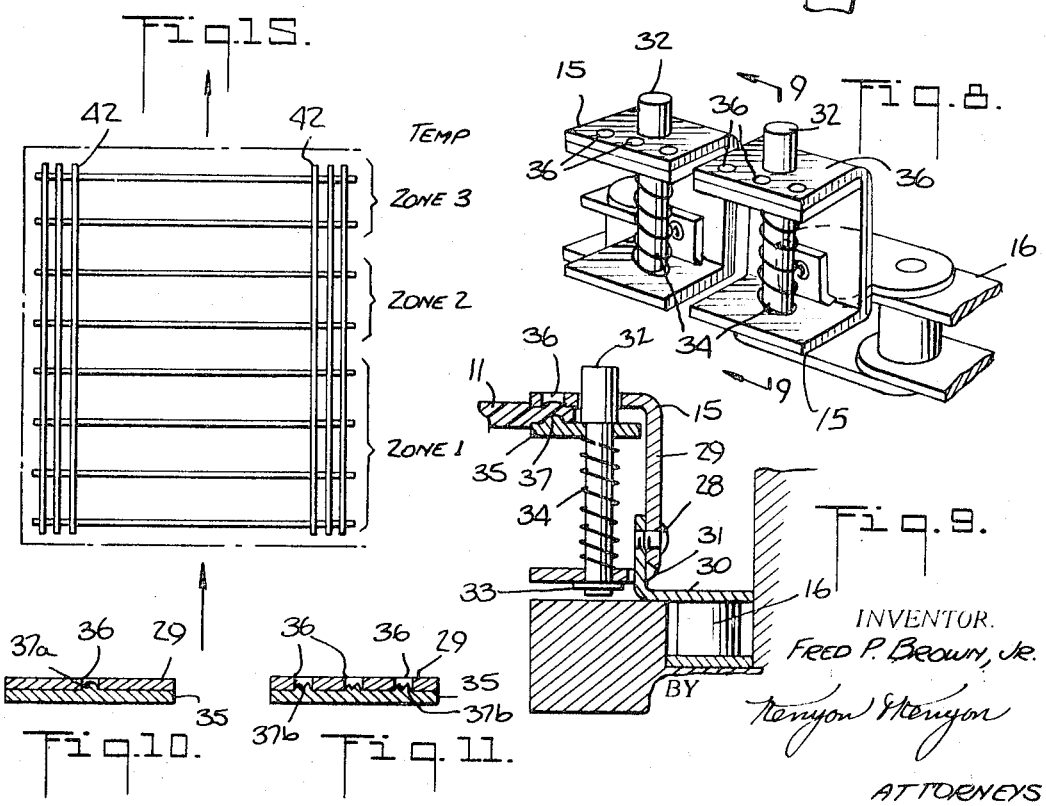

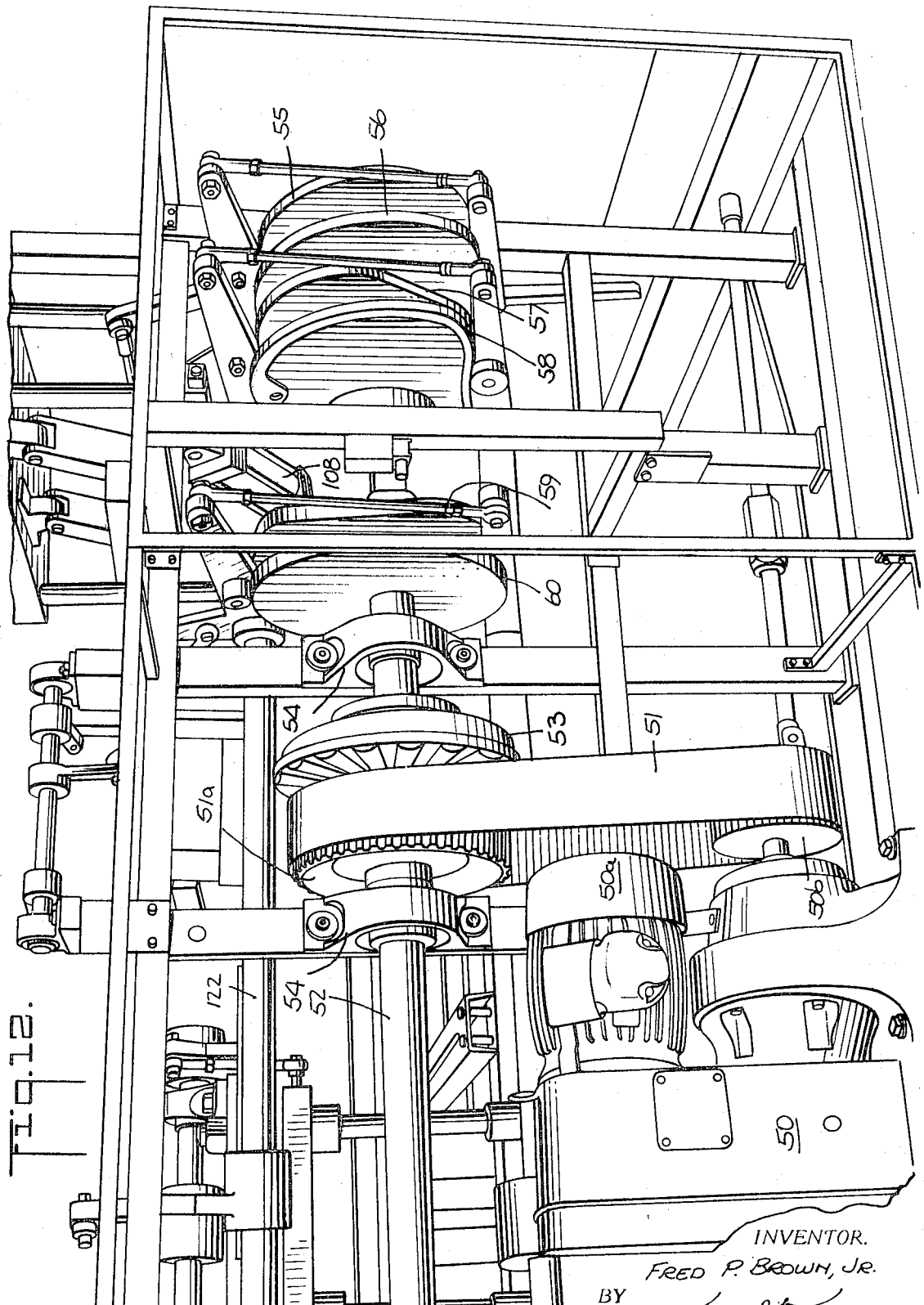

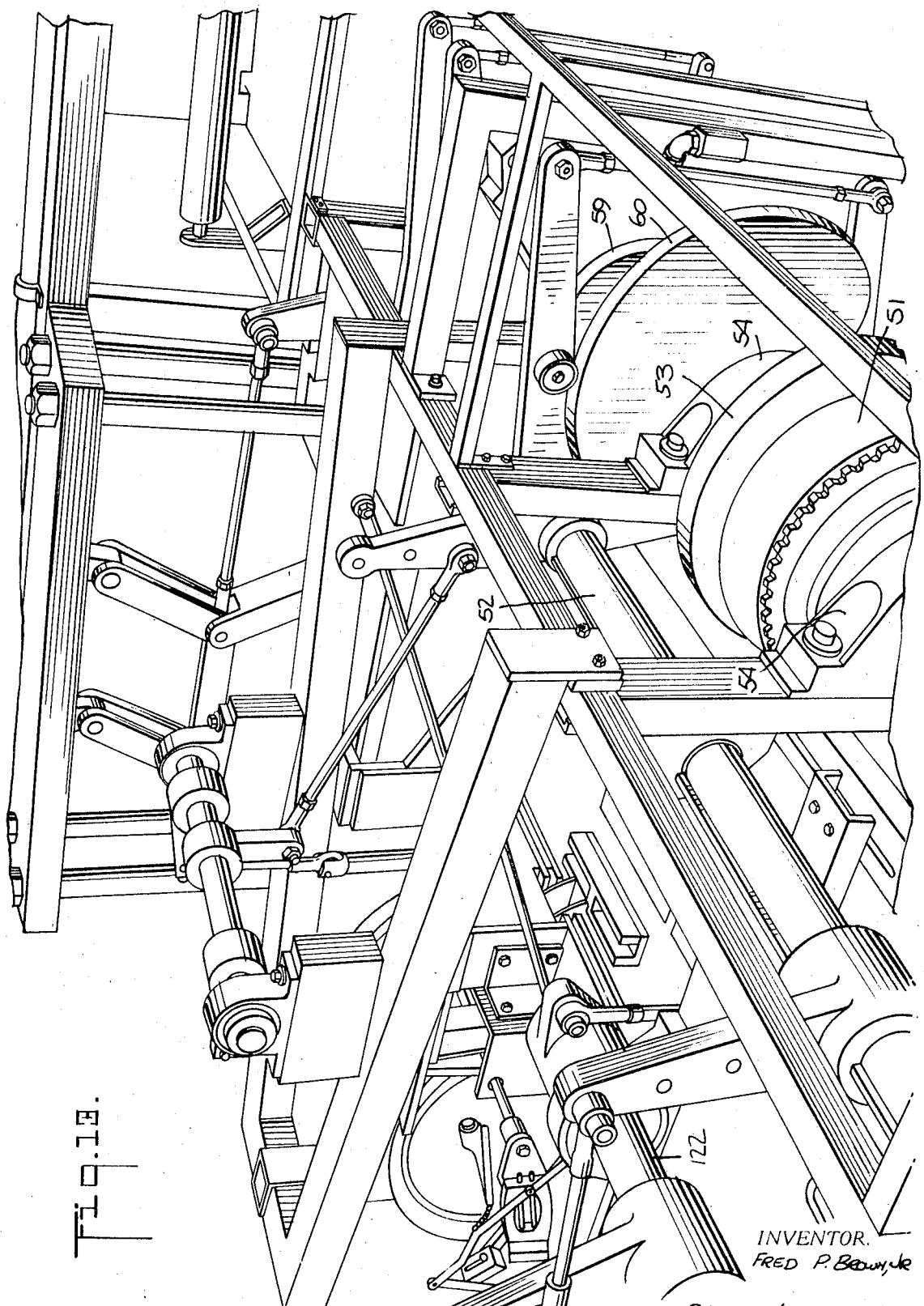

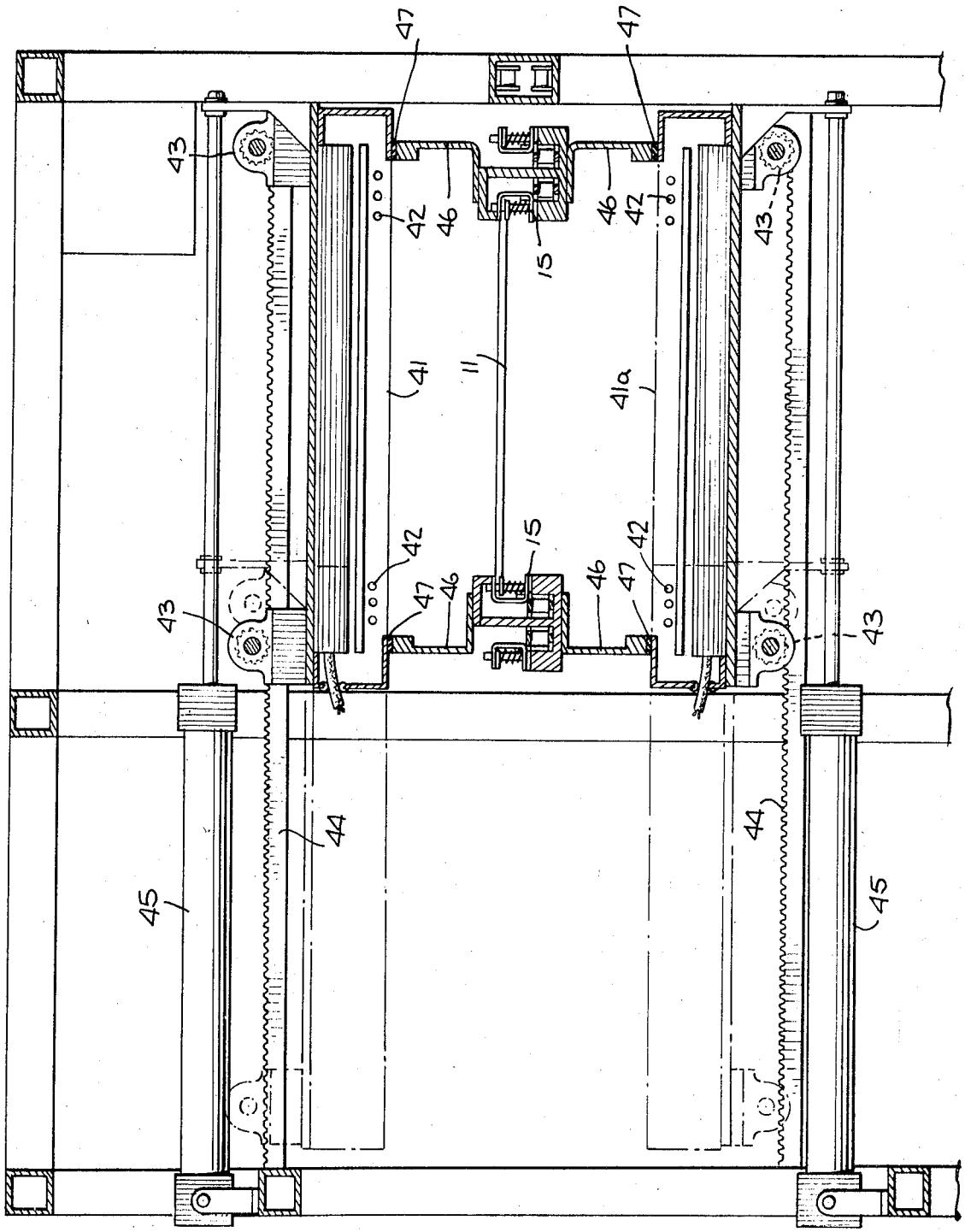

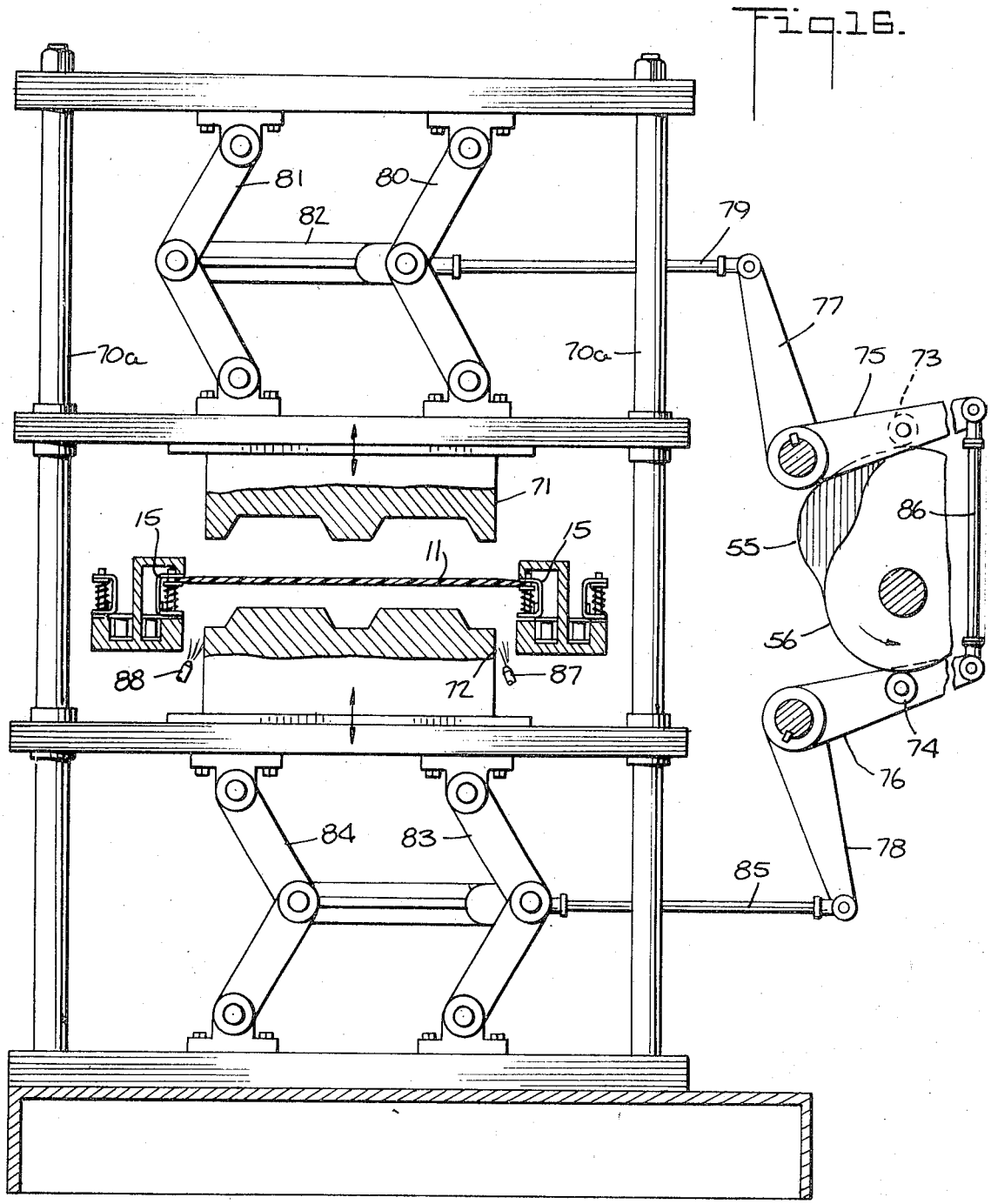
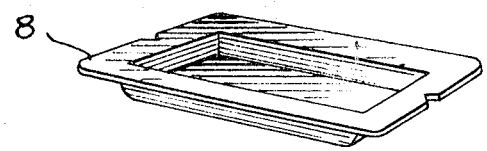

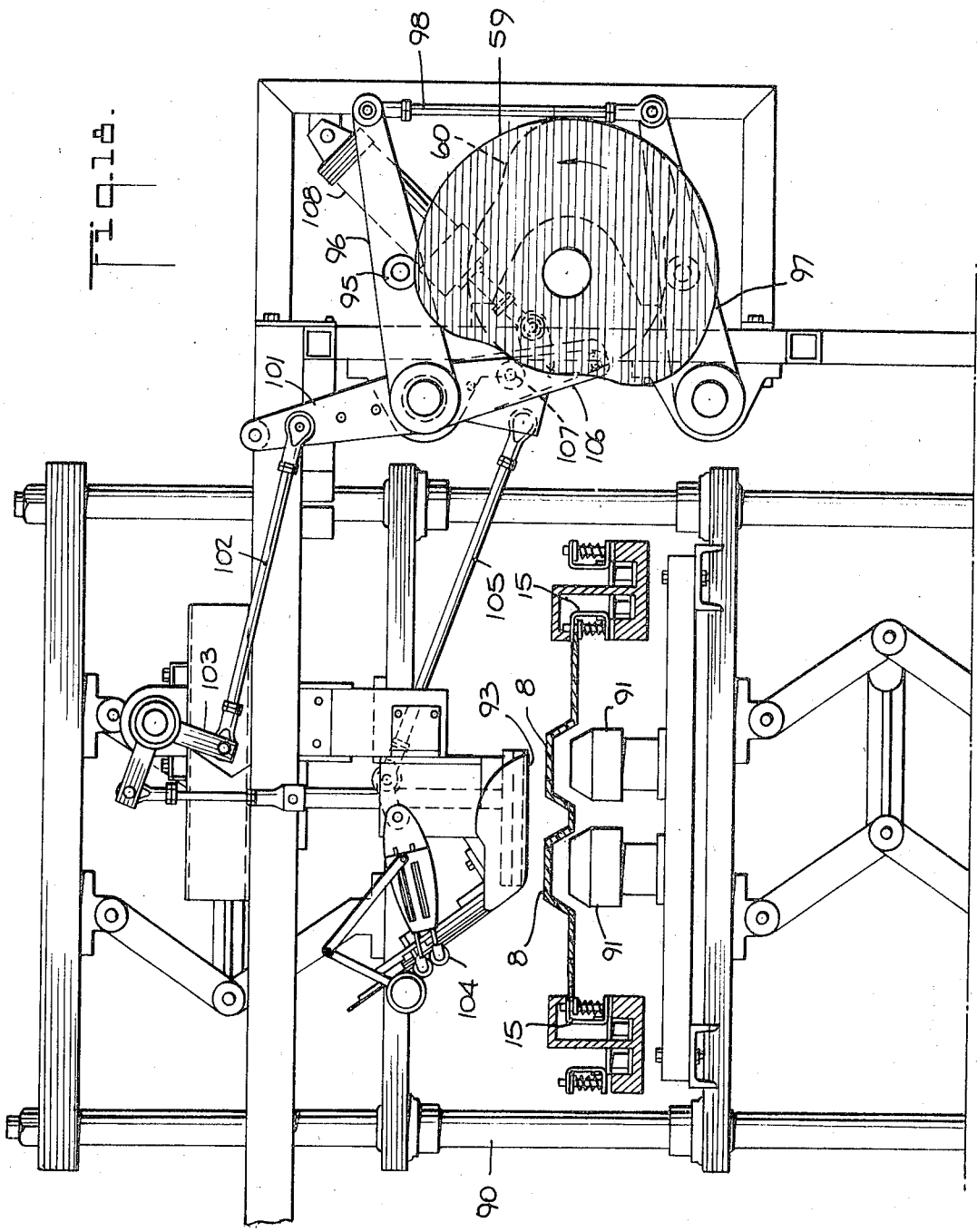

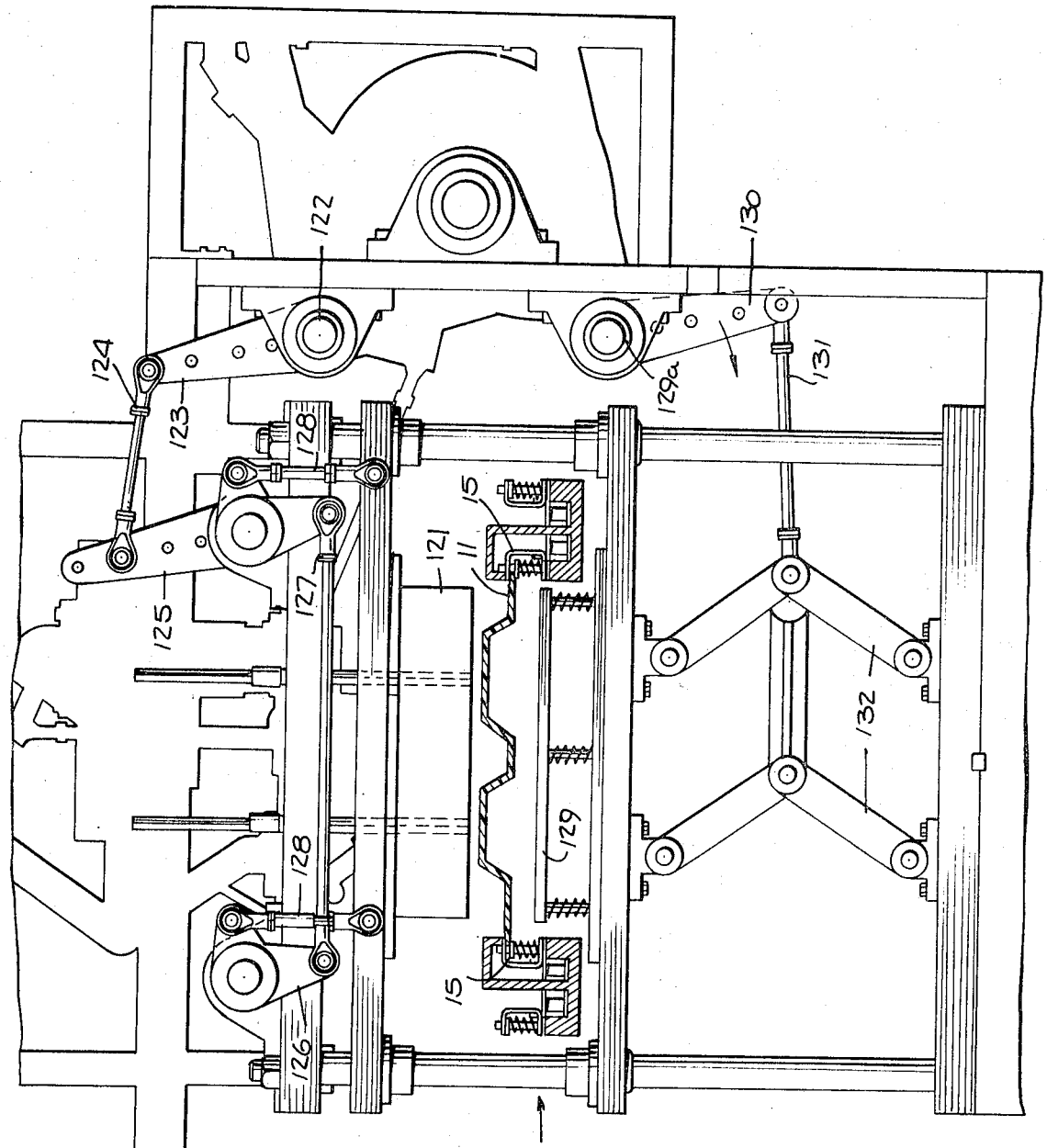

INVENTOR.
FRED P. BROWN, JR.
BY
Kenyon & Kenyon
ATTORNEYS

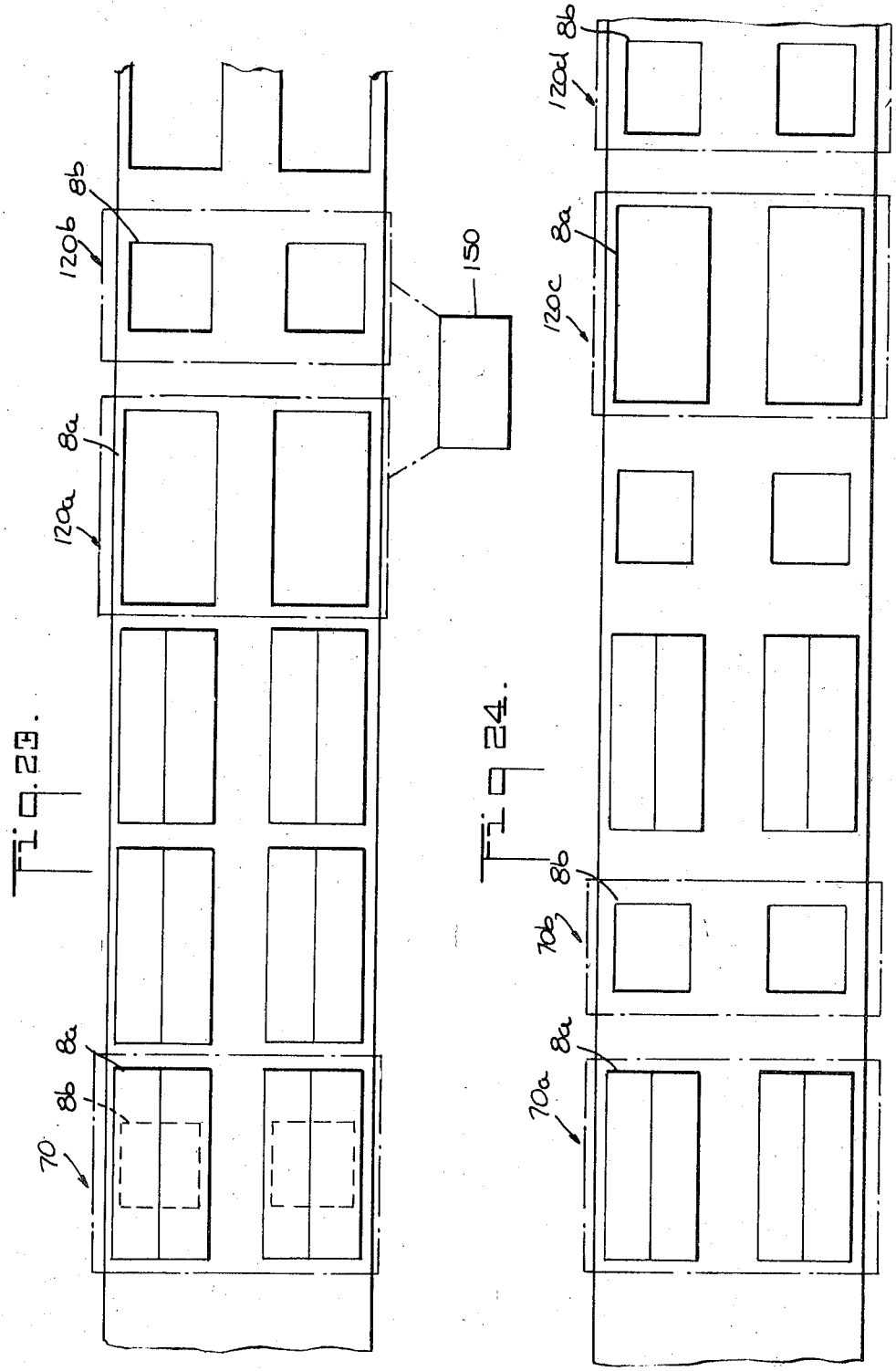

APPARATUS FOR FORMING CONTAINERS

BACKGROUND OF THE INVENTION

1. Field of the Invention

This invention relates generally to a method and apparatus for forming articles such as containers, and more particularly to one wherein the article is thermoformed from a web of plastic material.

In an ever-increasing amount, plastic containers are being utilized for packaging materials and food products because of the greater ease of manufacture, strength, durability and versitility provided by such material. Thus the use of plastic materials is of advantage in that their appearance is more attractive, they provide greater protection to the product being packaged, and they may be formed into configurations heretofore impossible with conventional types of material.

2. Description of the Prior Art

One of the problems existing in the prior art with respect to the manufacture of thermoformed articles is the obtaining of a forming machine for web material which machine is of high efficiency, flexibility and durability. In order to make plastic containers economically competitive with those of conventional materials, plastic container forming machines must be automated, have high production rates and be more flexible to facilitate changeover from one type or size of container to another.

Another problem which arises with thermoforming plastic articles from a web of material is that better holding means are required for advancing and holding the web of plastic material as it is being passed through the various stations necessary to produce the final product. Plastic materials in web form can have a significant memory factor. Therefore, means must be provided to enable the web of plastic material to be thermoformed into the desired configuration in a manner which opposes any tendency of the material to return to its original form.

Further, when plastic materials are formed into a container or the like, it is generally necessary to provide heating of the plastic to enable it to be formed into the desired configuration. Prior art machines have generally attempted to heat the material while at the forming station by means of heated dies and the like. This has presented problems in introducing excessive heat to the material and frequently results in a container of nonuniform thickness. Such problems particularly exist around the extremities of the container because of heat losses to the atmosphere. Machines of the prior art have also been extremely complex and subject to frequent failures. This has imposed limitations on plastic containers from an economically competitive standpoint. Further, costs of plastic containers have been unnecessarily increased because of the considerable time and labor expended during the changing of the machine to fabricate a different type or size container.

SUMMARY OF THE INVENTION

The method and apparatus disclosed herein overcome the deficiencies of the prior art by providing for a fully automated and highly efficient machine containing adjustable features for a rapid changeover of the machine to accommodate different sizes or shapes of containers. A web of plastic material is fed into the machine from a large continuous roll. Upon entering the machine, the web is gripped by members which subsequently advance the material through the entire length of the machine. The gripping members engage each side of the web of plastic material and hold it in a substantially horizontal plane during each of the operations required to form the container.

When the article is to be thermoformed, the material is first advanced to a heating station which can have a plurality of zones related to the amount of incremental advancement. The heating station may provide a constant temperature or a progressively increasing temperature and also has elevated temperatures provided at points where heat losses to the surrounding area are the greatest. This permits the plastic material to be subsequently advanced to the forming station at a uniform predetermined temperature which is necessary for obtaining a uniform thickness in the formed container. Since the work at each station requires a definite time interval, the advancing mechanism is provided with intermittent motion.

At the forming station, the dies having the desired container configuration engage the plastic material and form it into a container. Each of the dies is driven into engagement with the plastic material. The forming station may be further provided with a liquid spray directed toward the material in order to cool the material and thereby enabling the plastic to freeze and withstand any tendency to return to its original shape.

Upon opening of the dies, the formed container which is still a part of the continuous plastic web being advanced through the machine by the gripping members is advanced to a printing station. When printing is desired on a surface of the formed container, a printing plate is lowered into engagement with the container surface and imparts the desired printed format thereto.

The container is then subsequently advanced to a trimming and blanking station. At this station, a die descends with respect to a punch and severs the container from the continuous web of plastic material. The die is further provided with a hollow interior so that when the formed containers are severed from the web of plastic material, they can be stacked upon one another prior to their removal through the top of the machine. The remaining trimmed portions of the plastic web are advanced to the end of the machine whereupon the gripping members are disengaged therefrom and the trimmed material is cut off and then recovered as scrap.

The method and apparatus thus provided is fully automatic and capable of producing a great range of types of articles at a rapid and efficient rate. Further features are included which allow for adjustment of the various mechanisms thereby permitting rapid changeover of the machine.

Accordingly, it is a primary object of the invention to provide a simplified apparatus for thermoforming articles.

A further object of the invention is to provide an automated and highly efficient machine for producing thermoformed plastic containers.

A still further object of the invention is to provide a machine with means for gripping the side edges of a web of plastic material during each of its sequential operations.

A still further object of this invention is to provide a means for uniformly heating the plastic material to be thermoformed.

These and other objects, advantages and features of the invention will become more apparent from the following description taken in conjunction with the accompanying drawings.

BRIEF DESCRIPTION OF THE DRAWING

FIG. 1 is a perspective view of the container-forming apparatus disclosed herein looking toward the exit end of the apparatus;

FIG. 2 is a side elevation view of the apparatus showing from left to right the heating, forming, printing and blanking stations;

FIG. 3 is a plan view of the adjustable alignment mechanism of the material-advancing means;

FIG. 5 is a fragmentary side elevation view of the material-advancing means;

FIG. 6 is a fragmentary end elevation view of the material-advancing mechanism.

FIG. 7 is a fragmentary plan view of the material-advancing mechanism and its associated drive mechanism;

FIG. 8 is an enlarged perspective view of a portion of the chain of the material-gripping members;

FIG. 9 is a fragmentary vertical section view of one of the material-gripping members partly in cross section;

FIG. 10 is an enlarged fragmentary vertical section view of the engaging surfaces of one of the material-gripping members;

FIG. 11 is an enlarged fragmentary vertical section elevation view of an alternate embodiment of the gripping member engaging surfaces;

FIG. 12 is a fragmentary perspective view of the machine's primary driving mechanism;

FIG. 13 is a fragmentary perspective view of the printing and forming stations;

FIG. 14 is an enlarged vertical section view taken along the lines 14—14 of FIG. 2 and showing the retractable heating means;

FIG. 15 is a plan view of the heater unit and the individual elements thereof;

FIG. 16 is an enlarged vertical section view taken along the line 16—16 of FIG. 2 and showing the forming mechanism in the open position;

FIG. 17 is an enlarged fragmentary vertical section view of the forming mechanism in the closed position;

FIG. 18 is an enlarged fragmentary vertical section view taken along the line 18—18 of FIG. 2 and showing the printing mechanism;

FIG. 19 is an enlarged fragmentary vertical section view taken along the line 19—19 of FIG. 2 and showing the trimming and blanking station;

FIG. 22 is a perspective view of a container produced by the apparatus disclosed herein;

FIG. 23 is a schematic plan view of a web of plastic material as passed through the container-forming apparatus modified to include a pair of blanking stations;

FIG. 24 is a schematic plan view of a web of plastic material as passed through the container-forming apparatus modified to include a pair of forming and blanking stations.

BRIEF DESCRIPTION OF THE PREFERRED EMBODIMENT

Figure 4:
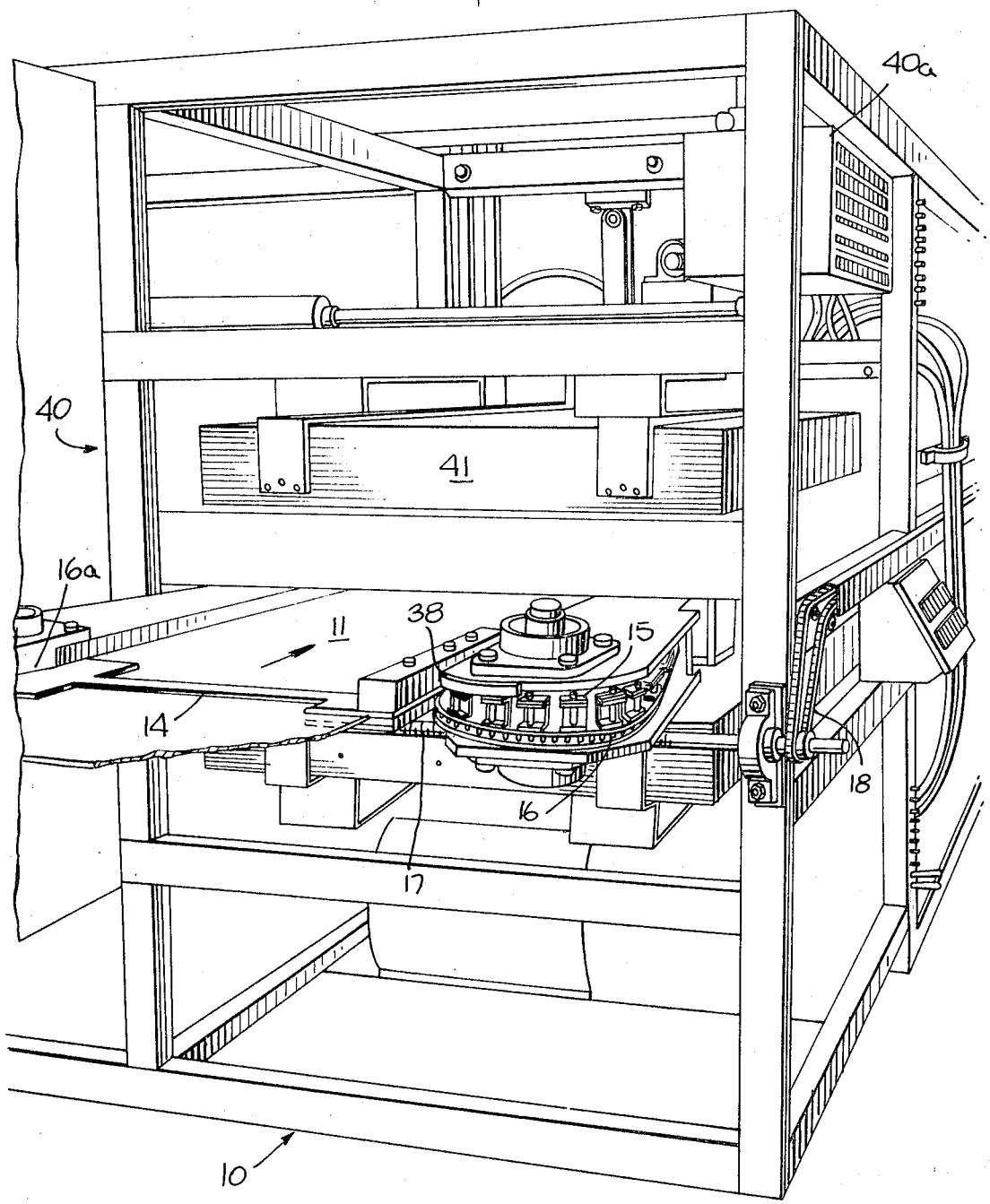
FIG. 4 is a partial perspective view of the entrance end of the container-forming apparatus.

With reference to the drawings, particularly FIGS. 1 and 2, the forming machine 10 includes a plurality of work stations at each of which distinct operations are performed. The web of plastic material 11 is fed into the machine from the roll 12. The plastic material may be any one of a variety of materials including expandable polystyrene foam, biaxially orientated polystyrene sheet, high-impact polystyrene, multipolymer, polypropylene, polyethylene, ABS, laminated construction, and other thermoplastic materials. The machine is adapted to form many types of plastic containers such as egg cartons, cottage cheese containers, margarine tubs, meat trays, etc. In the embodiment herein discussed the machine operation will be directed at forming a meat tray such as the type of tray illustrated in FIG. 22.

The web of plastic material 11 is advanced through the machine by means of an intermittently moving chain mechanism to be more fully described. The web of plastic material is first advanced into a heating station 40 wherein the material is appropriately softened by heat to a point sufficient to allow subsequent thermoforming.

After the heating has been accomplished, the advancing mechanism moves the web 11 to the forming station 70. At the forming station 70, because of the intermittent advancing mechanism, sufficient time is allowed for the material to be engaged by dies having the desired configuration of the ultimate product, herein illustrated as a meat tray 8.

Once the meat tray or container 8 has been formed, it is then advanced to one or more printing stations 90 at which point the words and designs of the label are printed onto the container.

The now formed and printed container, still attached to the web 11, is subsequently advanced to a trimming station 120. At this point the formed container 8 is severed from the web 11 and stacked in a magazine. The advancing mechanism with its intermittent motion allows the web of plastic material to remain at each particular station for a time period which is sufficient to complete the appropriate operation. Dependent on the type and size of containers being formed, either a single container or a plurality of containers can be formed during each cycle at the forming station.

As indicated in FIGS. 3–7, the advancing mechanism 13 can be adjusted to accommodate various widths of web 11. Referring to FIG. 4, the web of plastic material 11 is introduced into the machine between the guide plates 14 and engaged by the gripping members 15. The gripping members 15 are disposed along continuous chains 16 and 16a which respectively grasp the web 11 along each edge thereof. The interval between the adjacent reaches of the chains 16 and 16a can be adjusted by means of the threaded shafts 17 disposed at the forward and rear ends of the chains 16 and 16a (FIG. 6). A sprocket and chain drive 18 interconnects each threaded shaft 17 in order that adjustment of one of the threaded shafts provides for simultaneous movement of the other and thereby maintains equal spacing between chains 16 and 16a at each end (FIG. 5). Each threaded shaft 17 is threadedly engaged with the chain-supporting members 19 and 19a (FIG. 6). Because of the oppositely pitched threads on the threaded shafts 17, i.e., a left-hand thread on one end and a right-hand thread on the other end, any rotation will cause each of the chains to be moved simultaneously toward or away from the other. Thus, chain and sprocket drive 18 coupling the threaded shafts 17 insures that any movement of one shaft will cause a parallel movement of the other as illustrated in FIG. 3. Alternatively, if it is desired to move one of the continuous chains 16 or 16a without the other, this may be accomplished by rotating the nut 20 on one of the supports 19 or 19a in conjunction with one of the threaded shafts 17 (FIG. 6). When the plastic material being formed into the container is of the type which exhibits a tendency to stretch as it progresses through the machine, it is desirable to maintain the chains 16 and 16a slightly skewed so that the material is tautly held at each work station. This is accomplished by rotating until the desired spacing therebetween is achieved.

At the machine exit end, the continuous chains 16 and 16a are provided with a shaft 21 which is provided with a bevel gear 22 on the lower end thereof (FIG. 6). A horizontally disposed shaft 23 contains mating bevel gears 24 which engage the gears 22. Shaft 23 is driven by means of the gearbox 25, which in turn is driven by the primary drive motor to be hereinafter more fully discussed. The gearbox 25 is a packaged crossover cam index unit which drives for 90° and then dwells for 270° such as the type manufactured by Commercial Cam Machine Co., Chicago, Illinois. The gearbox 25 input is continuous and because of an intermittent drive means therein causes the output motion to be intermittent. Further gear reduction is provided by the gears 26a and b which operate in conjunction with idler gear 26c. Gears 26a and b are change gears which can be simultaneously varied to change the gear ratio. Thus by changing gears 26a and 26b, the amount of advancement for each intermittent movement of the advancing means 13 can be changed. The gearbox 25 is driven by the sprocket and chain drive, 27 and 27a, with the sprocket being keyed to the main shaft 52 which is ultimately driven by motor 50a (FIG. 12).

The gripping members 15, which are disposed along the entire length of each of the continuous chains 16 and 16a, are best illustrated in FIGS. 8 and 11. Each individual gripping member 15 is fastened by means of a screw at 28 to the continuous chains 16 and 16a and may thereby be readily replaced (FIG. 9). The U-shaped portion 29 is thereby fixedly attached to the bracket 30 which extends through the aperture 31. Supported by the base leg of the U-shaped bracket 29 is a plunger 32 which has a retaining ring 33 at the bottom thereof. A spring 34 urges plate 35 upward along with the plunger into engagement with the upper leg of the U-shaped bracket 29. As is seen in FIG. 9, a downward force exerted on plunger 32 causes plate 35 to move downward with the plunger. The web of plastic material 11 is firmly grasped between the plate 35 and the upper leg of the U-shaped bracket 29 because of the force exerted by spring 34. The upper leg of the U-shaped bracket 29 contains therein apertures 36 such as that illustrated in FIGS. 10 and 11. One or more dimples 37 are provided in plate 35 to firmly grasp the plastic web 11. The dimples 37 may be either a simple prong as at 37a in FIG. 10, or they may be double pronged as at 37b in FIG. 11, and may be pointed or have rounded peaks.

As the chains 16 and 16a move past the machine entrance for the web 11, a cam 38 engages and depresses the plunger 32 so that the web may be sandwiched between the surfaces on the gripping member 15 (FIGS. 4 and 7). As the gripping member 15 moves beyond the web-receiving station, the plunger 32 is released by passing beyond the end of cam 38 and permitted to move upwardly into secure engagement with the web 11. The firm grip as provided by the members 15 is necessary since the forming, printing and trimming operations are performed while the container is still part of the web 11. The gripping members 15 provide for sufficient grip of the plastic web 11 to preclude sagging of the plastic material and thereby holds the carton in the appropriate position at each work station.

The plastic web 11 is first advanced to a heating station 40 which has a plurality of zones (FIG. 4). As illustrated in FIG. 14, the web 11 passes between an upper and lower heating unit 41 and 41a, respectively. When fabricating a container from a material such as acetate, only one of the heating units 41 or 41a need be provided. Each of the heaters 41 and 41a comprise a plurality of individual heating elements such as the calrod heaters 42 illustrated in FIG. 15. The heating elements 42 are divided into zones, each of which has its temperatures individually regulated with dial settings being provided at control panel 40a (FIG. 1). Further, edgewise heaters are provided to compensate for the greater heat losses at the sides of the machine. The web of plastic material 11 is passed between the heaters 41 and 41a in the direction of the arrow illustrated in FIG. 15. Zone 1 provides for an initial heating and warming of the material. Zones 2 and 3 subsequently increase the temperature of the plastic material 11 so that when the material exits from zone 3 and enters into the forming station it is appropriately softened to allow forming into a container. This zone control, which provides for progressively increasing the temperature and thereby progressively expands the material, is desireable to prevent overheating of the plastic material 11, particularly in view of the intermittent motion of the advancing mechanism 13. Further, the zone-type heating provides additional compensation for any heat losses existent within the machine and produces a uniformly heated plastic material at the forming station 70. As illustrated in FIG. 15, zones 1, 2 and 3 each contain a number of heater elements 42 and zone 1 covers twice the area as each of the other zones. Each zone of heater elements 42 is spaced so that an incremental advance of the web of plastic material 11 will move the material to the next zone of heater elements 42 except in zone 1 which covers two incremental advancements, Therefore, as the web of plastic material is advanced through the heating station 40, each area to be subsequently formed into a container intermittently stops twice in zone 1 and then once in zones 2 and 3 to provide for the desired progressive heating of the plastic material.

Each of the heaters 41 and 41a are retractable to allow for their removal from adjacent the path of the web of plastic material as illustrated in FIG. 14. Rotatable gears 43 are provided at each end of the heaters 41 and 41a and mate with the fixed rack 44. An actuator is provided at 45 to provide the necessary force to drive the heaters 41 and 41a along rack 44.

The engagement of gears 43 with racks 44 prevent binding of the heaters when moving by keeping the shafts of the gears 43 perpendicular to the length of the rack. Heat shields 46 are provided on each side of the plastic web 11 being passed between the heaters 41 and 41a. The heat shields 46 extend to the base of the heater and have an asbestos spacer provided at 47.

The retractable feature is particularly desirable to provide for maintenance and servicing of the machine. Since the heating station 40 is operated at a substantially high temperature, servicing may be accomplished only when the area is sufficiently cooled. Cooling may be accelerated since the heaters may be quickly withdrawn and the area is sufficiently vented to allow personnel to provide the necessary service. Further, the retractable feature allows for machine shutdown without any destruction of the plastic material at the heating station. This is accomplished by immediately retracting the heaters to the dotted position whenever the advancing mechanism 13 is disengaged.

The primary drive system is best illustrated in FIGS. 12 and 13. A variable speed drive 50 driven by AC motor 50a is coupled to a pulley 50b which drives belt 51. Belt 51 drives pulley 51a which rotates the main drive shaft 52. An electric clutch 53 when electrically engaged couples pulley 51a through the clutch to the drive shaft 52. Bearing blocks 54 support shaft 52 and are provided on each side of pulley 51a and clutch 53.

Mounted on drive shaft 52 are six conjugate cams having the appropriate profiles to provide the desired motions as will be discussed (FIG. 12). Cams 55 and 56, nearest the entrance side of the machine, are used for driving the upper forming and blanking dies. Cams 57 and 58, adjacent thereto, are used to drive the lower forming and blanking dies. Cams 59 and 60, which are nearest the clutch 53, are used to drive the printing apparatus. Each of the cams has associated therewith the linkages necessary to provide the appropriate motion at each work station. These linkages and the drive systems will be more fully discussed below.

After heating, the plastic material is advanced to the forming station 70, illustrated best in FIGS. 16 and 17. The blank web of plastic 11 is advanced and stopped between the open forming dies 71 and 72 of FIG. 16. Cams 55 and 56 are engaged respectively by cam followers 73 and 74. The cam followers are attached to linkage bars 75 and 76, each of which are in turn keyed to linkage bars 77 and 78, respectively, and accordingly move as a crank member. A push rod 79 couples the upper linkage bar to toggle sections 80 and 81. The toggle sections 80 and 81 are coupled to each other by means of the intermediary linkage 82 and, therefore, move similarly. As push rod 79 reciprocates, the toggle sections 80 and 81 cause the upper forming die 71 to vertically move on guide bars 70a into engagement with flat web of plastic material 11. A similar motion is caused on the lower forming die 72 by toggles 83 and 84 and push rod 85. Each of the cam followers moves in conjunction with the other because of the interconnecting linkage 86. The cams therefore operate as conjugate cams and provide for either sequential or simultaneous engagement of the web by each of the forming dies 71 and 72, dependent on the type of tools employed. When the machine is used for vacuum or pressure forming, a male or female die may be used with or without a pressure box. The cam profiles are such that the engagement of the forming dies 71 and 72 with the web 11 are at a velocity which permits drawing the material into the desired container shape.

As is seen in FIG. 17 when the toggles are vertical or in the erect position, the dies are closed and form the container as indicated. Water spray jets may be included as at 87 and 88 (FIG. 16) to spray onto the material being formed. This causes a freezing of the formed plastic material and precludes it from returning to its original shape as the dies are opened. In this way the "memory" of the plastic is overcome. Water may also be circulated in passages provided in the forming dies 71 and 72.

The now formed container 8 is moved to the printing station 90 (FIG. 18) by means of the intermittent motion of the advancing means 13. When a grip of words, a particular design, or other indicia is to be printed on the container, the printing station may be provided as in FIG. 18. A pair of holders 91 are provided to support the container surface while printing is being applied. The printing head 93 is driven vertically upward and downward by means of the conjugate cams 59 and 60. A cam 59 is engaged by cam follower 95 at the upper end thereof. Cam follower 95 is mounted on linkage bar 96 which at its rearward end is attached to similar linkage bar 97 by means of the intermediary bar 98 so that a conjugate drive is provided. At the other end of linkage bar 96, an intermediary linkage 101 is pivotally connected. A push rod 102 is connected near the end of linkage 101 and at the other end to L-shaped member 103. Rotation of member 103 causes vertical lifting of the printing plate 93. A roller is provided at 104 which, when imparted with the appropriate motion, inks the type on the printing plate 93. The printing plate 93 then engages the container 8 being printed. The roller 104 is connected by linkage 105 to a pivotally mounted linkage 106. A cam follower 107 is provided on linkage 106 and engages cam 59. An air cylinder 108 is connected to linkage 106 and acts as a return spring for the roller 104. Flow control within the air cylinder 108 adjusts the amount and rate of exhaust at the rearward end thereby controlling the velocity at which the roller 104 returns to the rest position. As illustrated in FIG. 2, the printing station 90 includes a pair of printing plates 93 to facilitate printing different colors onto the container. It is noted that when a carton upon which no printing is to be fabricated, this section may be readily eliminated or deactivated.

Figure 20:
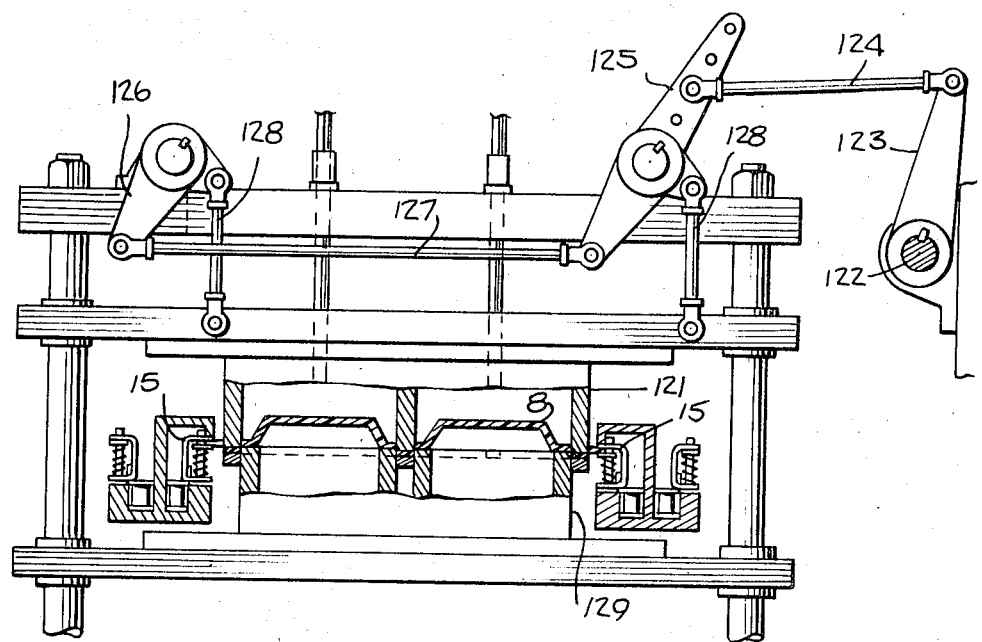
FIG. 20 is an elongated fragmentary transverse vertical section view of the trimming and blanking station in the closed position.
Figure 21:
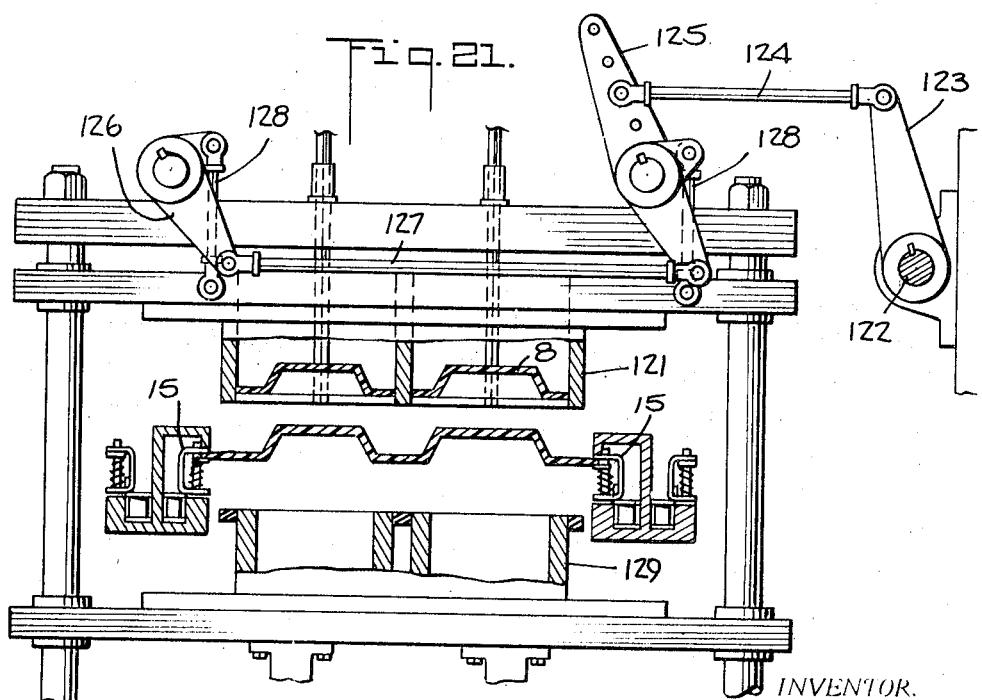
FIG. 21 is a transverse vertical section view of the blanking station in the opened position.

The carton which has now been formed and printed is subsequently advanced to the trimming station 120 wherein it is severed from the web 11 and stacked therewith. The trimming station is best illustrated in FIGS. 19–21. The upper die 121 which engages the web 11 is driven by means of a linkage connected to upper shaft 122 (FIG. 19). Shaft 122 is driven by means of cams 55 and 56 which has its linkage arm fixedly attached to the shaft. Shaft 122 rotates linkage bar 123 and is limited in its rotation because of the input from the cams 55 and 56, cam 55 with its linkage fixedly attached to shaft 122. A connecting rod 124 causes oscillation of linkage 125 which is synchronized to the left-hand drive 126 by means of the connecting rod 127. Oscillation of linkage 125 causes the vertical member 128 to drive the die 121 with an upward and downward motion. The lower punch 129 is driven from the lower shaft 129a and is connected thereto by means of linkage member 130, push rod 131 and toggle 132. Lower shaft 129a is rotated by cams 57 and 58 in the manner previously described. Toggle 132 operates similar to that previously discussed for the forming station. Toggle 132 causes vertical movement of the lower punch 129 with the appropriate timing so that the die 121 and punch 129 engage the web 11 at approximately the same time. The lower drive, because of the toggle drive, enables the punch 129 to have a greater stroke than die 121. This causes the severed carton to be pushed into the hollow portion of the die 121 and stacked therewithin (FIG. 21).

FIG. 19 illustrates the initial cycle at the trimming station 120 with the die 121 and punch 129 in the open position. FIG. 20 illustrates the die and punch closed and severing a pair of cartons 8 from the web 11. As indicated, the punch 129 moves into the hollow portion of the die 121 and pushes the severed carton 8 up and into the die. FIG. 21 illustrates the die and punch in the open position with the previously severed cartons stacked in the hollow die 121. Subsequent closing of the die 121 and punch 129 will cause the next carton advanced to the trimming station 120 to be severed from the web again and stacked beneath the previously severed carton. In this manner a plurality of cartons may be severed and stacked within the die 121 for removal from the machine. The cartons once severed from the web are accumulated between the upright walls of the die 121 wherein they become stacked upon one another so that they may ultimately be removed through the top of the machine (FIG. 1).

The excess material on the edges of the web 11 and between severed cartons is then exited from the machine and released by the gripping members 15. The excess material may be dispensed into a chopping station 140 or otherwise discarded as scrap. The chopping station 140 is located at the exit end of the machine as illustrated in FIG. 1. There, the excess material is passed through the spacing between the stationary member 141 and the vertically movable blade 142. Blade 142 is driven upward into engagement with the excess material by means of the pneumatic actuator 143, although a mechanical linkage may be substituted. Dependent upon the cycle of the blade 142, the excess material may be chopped into any convenient scrap size.

The foregoing discussion was primarily directed at utilizing the machine to fabricate a single type of container such as the meat tray 8 of FIG. 22. FIGS. 23 and 24 further illustrate the versatility of the machine of this disclosure and the manner in which it may be adapted to form other types of containers. In FIG. 23 there is illustrated a single forming station 70 and a pair of trimming stations 120a and 120b. The forming station 70 is illustrated as fabricating the larger container 8a. By simply changing the forming dies, the machine may be adapted to fabricate the smaller container 8b. To facilitate a rapid changeover of the machine to make a different type container, a pair of blanking stations are provided. Station 120a is provided to blank the carton 8a whereas station 120b is provided to blank carton 8b. Accordingly, when the machine is to be changed from making the larger size container illustrated to another type, the forming dies are changed and a different trimming station is activated by means of the clutch 150. This makes it possible to rapidly modify the machine to fabricate a different type or size container.

FIG. 24 illustrates still another variation which may be incorporated into the machine. There, a pair of forming stations 70a and 70b are provided. Each station contains different dies which can either singly or simultaneously fabricate containers 8a and 8b. This allows the machine to be rapidly changed to fabricate a different type container. Similarly, a pair of trimming stations are provided at 120c and 120d to blank and trim the containers 8a and 8b. This modification allows the machine to simultaneously fabricate different types or size containers. It is evident that this same type embodiment could be used to make a greater number of the same type of containers as well as contain means to disengage one or more of the stations.

Figure 25:
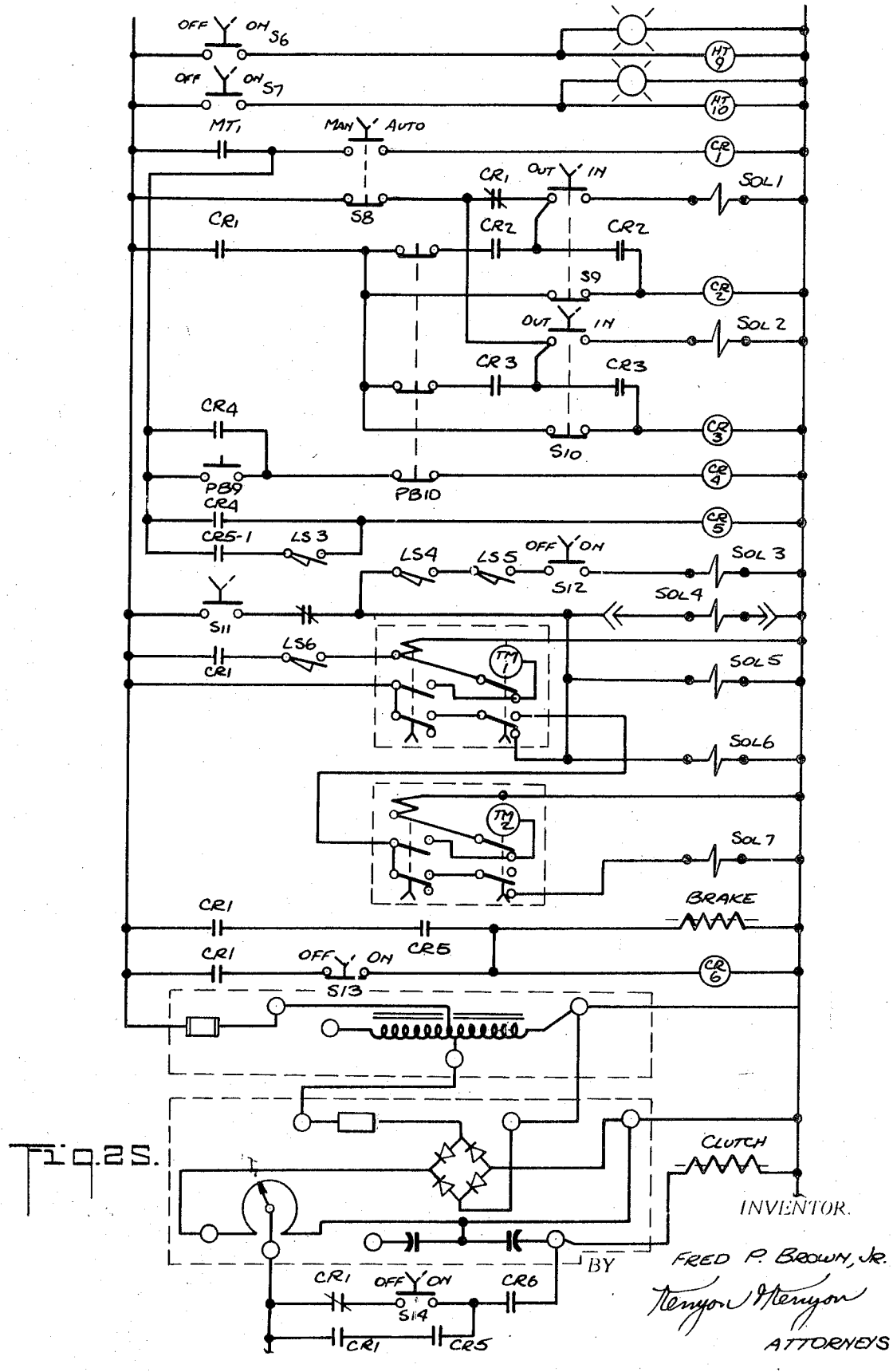
FIG. 25 is a simplified wiring diagram of the circuitry for controlling the operations of the machine disclosed herein.

With reference to FIG. 25, the operation of the electrical circuitry of the machine will be described. By appropriate switches (not shown), the main drive motor is activated. When the main drive motor is activated, contacts MT-1 are closed and the machine may be operated in the automatic mode. With switch S8 in the AUTO position and switches S9 and S10 in the OUT position, relays CR 1, CR 2 and CR 3 are energized. Contacts CR 2 and CR 3 close and provide holding circuits for relays CR 2 and Cr 3 respectively. The upper and lower heaters may then be moved into position above and below the web of plastic material respectively by placing switches S9 and S10 into the IN position which activate solenoids SOL 1 and SOL 2 to drive the heaters. These switches may also be used to drive the heaters when switch S8 is in the MAN position by means of the same solenoids.

When it is desired to stop the cycle during the automatic mode, pushbutton switch PB 10 is depressed which then causes each of the heaters to be withdrawn from the plastic material and thereby precludes destruction thereof. To restart the cycle, pushbutton switch PB 9 is depressed which activates relay CR 4 and contacts CR 4 which retain the relay activated as the switch is released. To return the heaters to their positions above and below the web of plastic material, switches S9 and 10 are returned to the IN position.

Another set of contacts CR 4 is provided to activate relay CR 5. Contacts CR 5-1 provide a holding circuit for relay CR-5 through limit switch LS 3 which is closed when the lower forming platen is up. When limit switch LS 6 is closed and the adjacent contacts CR-1 are closed, as is the case when the lower forming platen is up, then the timer TM 1 is energized to actuate solenoid SOL 5. Solenoid SOL 5 provides an air assist for the forming tools. Likewise, timer TM 1 activates solenoid SOL 6 which applies the vacuum to the forming tools. Timer TM 1 also actuates timer TM 2 which energizes solenoid SOL 7 to provide the liquid spray at the plastic material.

Switches S6 and S7 are provided to control heaters HT 9 and HT 10 and their associated indicator lights. These heaters are provided at the forming die station to insure that the plastic material is at the proper temperature during the forming operation.

Relay CR 5, which as previously discussed is activated by depressing the cycle start switch PB 9, also energizes the brake when contacts CR 5 and CR 1 are closed. Closing of these contacts also energizes relay CR 6 which in turn allows for the clutch to be energized. By energizing the clutch, the main drive motor is coupled to the remainder of the machine. The brake is of the fail-safe type and is on the machine side of the clutch. The brake thereby provides a means for stopping mechanical movement of the machine when the cycle stop switch PB 10 is activated and the clutch disengages the motor from the machine. Therefore, opening switch PB 10 deenergizes relay CR 5 unless it is held open by CR 5 and LS 3 as is the case when the lower printing platen is raised. When relay CR 5 is deenergized, both the brake and clutch are deenergized.

A further feature includes the scrap chopper operated by solenoid SOL 3. By placing switch S12 into the ON position along with limit switches LS 4 and LS 5 being closed, the scrap chopper is activated. LS 4 is actuated by the cam clamp chain index drive whereas LS 5 is actuated by the safety door on the scrap chopper.

Although the foregoing description is directed at a preferred embodiment of the invention, it is noted that other variations and modifications may be made without departing from the spirit and scope thereof.

What is claimed is:

1. A machine for thermoforming containers from a web of plastic material comprising in combination:
   a. means for intermittently advancing the web of plastic material through said machine;
   b. means disposed adjacent to the path of travel of the web of plastic material for heating the web to a temperature sufficient to soften the web and permit forming thereof, said heating means including a plurality of individual heating elements grouped into adjacently spaced zones extending both above and below and substantially parallel to the plane of the path of travel of the web, each zone including a plurality of individual heating elements disposed transverse to the path of travel of the web of plastic material through the machine and additional heating elements disposed adjacent to the edge portions of the path of travel of each of the opposite sides of the web of plastic material and parallel to the path of travel of the web of plastic material through the machine, said additional heating elements being adjacent to the end portions of the heating elements extending substantially transverse to the path of travel, each of said zones generating an amount of heat sufficient to cause the web of plastic material to progressively increase in temperature as it is intermittently advanced adjacent said heating means;
   c. means for individually controlling the amount of heat generated in each of said adjacently spaced zones;
   d. means disposed adjacent to said heating means for forming a portion of the web of plastic material into a container; and
   e. means disposed downstream of said forming means for severing the formed container from the web of plastic material.

2. A machine in accordance with claim 1 in which said means for heating the web of plastic material comprises a pair of heater units, each of said heater units being adapted to be disposed adjacent a different one of the opposite sides of the web of plastic material.

3. A machine in accordance with claim 2 which further includes means for moving each of said heater units between a retracted position removed from the path of travel of the web of plastic material to an operative position adjacent the path of travel of the web.

4. A machine for thermoforming containers from a web of plastic material comprising in combination:
   a. means for intermittently advancing the web of plastic material through said machine;
   b. means disposed adjacent to the path of travel of the web of plastic material for heating the web to a temperature sufficient to soften the web and permit forming thereof, said heating means including a plurality of individual heating elements grouped into adjacently spaced zones, each of said zones generating an amount of heat sufficient to cause the web of plastic material to increase in temperature as it passes adjacent said heating means, said means for heating the web of plastic material including a pair of heater units, each of said heater units being adapted to be disposed adjacent a different one of the opposite sides of the web of plastic material;
   c. means for moving each of said heater units between a retracted position removed from the path of travel of the web of plastic material to an operative position adjacent the path of travel of the web;
   d. means for individually controlling the amount of heat generated in each of said adjacently spaced zones;
   e. means disposed adjacent to said heating means for forming a portion of the web of plastic material into a container; and
   f. means disposed downstream of said forming means for severing the formed container from the web of plastic material.

5. A machine in accordance with claim 4 which further includes structure forming a heat shield enclosure disposed adjacent each of the opposite sides of the plane of the path of travel of the web, each of said enclosures including a pair of heat shields spaced apart from one another on opposite sides of the path of travel of the web of plastic material being advanced between said heater units and an additional pair of heat shields spaced apart from one another and extending transversely to the path of travel of the web between said pair of heat shields, whereby each of said enclosures provides a substantially enclosed heat conduit for the web of plastic material.

6. A machine for thermoforming containers from a continuous web of plastic material comprising:
   a. means for advancing the continuous web of plastic material through said thermoforming machine;
   b. means for heating the web of plastic material to a temperature sufficient to permit forming thereof;
   c. means for forming a portion of the web of plastic material into a container of the desired shape, said forming means including:
      i. upper and lower forming dies for engaging the opposite sides of the web of plastic material;
      ii. a pair of conjugate cams mounted on a common shaft for driving each of said upper and lower forming dies; and
      iii. means interconnecting each of said upper and lower forming dies with a different one of said pair or conjugate cams and being connected to one another for cyclically reciprocating said dies into engagement with the opposite sides of the web of plastic material to form the container; and
   d. means for severing the formed container from the web of plastic material.

7. A machine in accordance with claim 6 wherein said means for heating the web of plastic material comprises a pair of heater units, each of said heater units being adapted to be disposed adjacent a different one of the opposite sides of the web of plastic material.

8. A machine in accordance with claim 7 wherein each of said heater units comprises a plurality of individual heating elements grouped into adjacently spaced zones, each of said zones generating an amount of heat sufficient to cause the web of plastic material to increase in temperature as it passes adjacent said heating means, and means for individually controlling the amount of heat generated in each of said adjacently spaced zones.

9. A machine in accordance with claim 6 wherein each of said interconnecting means comprises:
   a. a cam follower engaging one of said pair of conjugate cams;
   b. a first arm pivotally connected to said cam follower;
   c. a second arm having one end thereof pivotally connected to said first arm;
   d. a horizontally extending push rod having one end thereof pivotally connected to said second arm; and
   e. a pair of centrally connected toggles engaging the other end of said push rod so that horizontal movement of said push rod causes the opening and closing of said toggles.

10. A machine in accordance with claim 9 which further includes:
    a. an interconnecting member having one end thereof pivotally connected to the first arm of said lower forming die interconnecting means and the other end thereof connected to the first arm of said upper forming die interconnecting means.

11. A machine in accordance with claim 6 which further includes:
    a. spray means disposed adjacent to the opening between said forming dies so that liquid may be sprayed therein during the forming operation.

12. A machine in accordance with claim 6 wherein said severing means includes:
    a. a punch means disposed adjacent one side of the path of travel of the oppositely disposed surfaces of the web of plastic material;
    b. a die means disposed adjacent the other side of the web of plastic material; and
    c. drive means for cyclically moving said punch means and said die means toward one another and into engagement with the web of plastic material to cause the formed carton to be severed therefrom.

13. A machine in accordance with claim 12 which further includes:
    a. a pair of conjugate cams for imparting the desired motion to said punch and die means;
    b. means interconnecting each of said punch and die means with one of said pair of conjugate cams to provide for substantially simultaneous engagement of each of said punch and die means with the web of plastic material and thereby sever the formed carton therefrom.

14. A machine in accordance with claim 13 wherein each of said interconnecting means comprises:
    a. a cam follower engaging one of said pair of conjugate cams;
    b. a first arm pivotally connected to said cam follower;
    c. an elongated shaft being fixedly engaged with one end of said first arm to be rotated thereby;
    d. a second arm fixedly attached to said elongated shaft;
    e. a longitudinally extending push rod having one end thereof pivotally connected to said second arm; and
    f. a pair of centrally connected toggles engaging the other end of said push rod in order that horizontal movement of said push rod causes the opening and closing of said toggles.

15. A machine in accordance with claim 13 which further includes:
    a. a motorized drive means;
    b. a shaft extending from said drive means for mounting each of said conjugate cams; and
    c. clutch means interposed between said drive means and said conjugate cams.

16. A machine in accordance with claim 12 wherein said punch means comprises an elongated member having a hollow inner portion shaped to the outer configuration of the formed container, whereby the containers are stacked within said hollow elongated member as they are severed from the web of plastic material.

17. A machine in accordance with claim 6 wherein said advancing means comprises a continuous chain of web-gripping members disposed adjacent each of the opposite edge portions of the web of plastic material.

18. A machine in accordance with claim 17 wherein said advancing means includes:
    a. an intermittent drive means which dwells for at least a portion of each cycle; and
    b. a set of change gears coupling said intermittent drive means to said continuous chain, whereby the incremental advance of the continuous chain may be adjusted by changing the ratio of said change gears.

19. A machine in accordance with claim 6 wherein said severing means includes:
    a. a pair of adjacently spaced punch means disposed adjacent the path of travel of one of the opposite surfaces of the web of plastic material;
    b. a pair of adjacently spaced die means disposed adjacent the path of travel of the other surface of the web of plastic material;
    c. drive means for cyclically moving said punch means and said die means toward one another and into engagement with the web of plastic material to cause the formed carton to be severed therefrom; and
    d. clutch means for engaging each of said pair of punch means and said pair of die means with said drive means.

20. A machine in accordance with claim 19 which further includes a pair of upper and lower forming dies driven by said pair of conjugate cams into engagement with the opposite sides of the web of plastic material to form the container.

21. A machine in accordance with claim 1 wherein the area of said zones is such that incremental advancement of the web of plastic material causes the web to stop twice in said first zone and once in said subsequent zone.

* * * * *

UNITED STATES PATENT OFFICE
CERTIFICATE OF CORRECTION

Patent No. 3,647,335    Dated March 7, 1972

Inventor(s) Fred P. Brown, Jr.

It is certified that error appears in the above-identified patent and that said Letters Patent are hereby corrected as shown below:

Column 4, line 45, after "rotating" insert -- the movable nut 20 as the threaded members 17 are rotated --.

Column 4, line 71, "and" should be -- through --.

Column 5, line 52, "desireable" should be -- desirable --.

Signed and sealed this 21st day of November 1972.

(SEAL)
Attest:

EDWARD M. FLETCHER, JR.
Attesting Officer

ROBERT GOTTSCHALK
Commissioner of Patents